United States Patent
Choe et al.

(10) Patent No.: US 10,983,515 B2
(45) Date of Patent: Apr. 20, 2021

(54) DRIVING INFORMATION DISPLAY DEVICE, DRIVING INFORMATION DISPLAY METHOD, AND METHOD OF CONTROLLING DRIVING SPEED OF WORKING VEHICLE

(71) Applicant: HANWHA DEFENSE CO., LTD., Changwon-si (KR)

(72) Inventors: Yun Geun Choe, Changwon-si (KR); Woo Yeol Kim, Changwon-si (KR)

(73) Assignee: HANWHA DEFENSE CO., LTD., Changwon-si (KR)

( * ) Notice: Subject to any disclaimer, the term of this patent is extended or adjusted under 35 U.S.C. 154(b) by 153 days.

(21) Appl. No.: 16/118,800

(22) Filed: Aug. 31, 2018

(65) Prior Publication Data

US 2019/0227543 A1 Jul. 25, 2019

(30) Foreign Application Priority Data

Jan. 24, 2018 (KR) .......................... 10-2018-0008536

(51) Int. Cl.
*G05D 1/00* (2006.01)
*G05D 1/02* (2020.01)
(Continued)

(52) U.S. Cl.
CPC ........... *G05D 1/0038* (2013.01); *B60W 50/14* (2013.01); *G05D 1/0223* (2013.01);
(Continued)

(58) Field of Classification Search
CPC .. G05D 1/0038; G05D 1/0246; G05D 1/0223; B60W 2050/146; B60W 30/143;
(Continued)

(56) References Cited

U.S. PATENT DOCUMENTS 7,979,207 B2 7/2011 Chowdhary et al.
8,209,120 B2 6/2012 Breed
(Continued)

FOREIGN PATENT DOCUMENTS

KR 10-1622176 B1 5/2016
KR 10-1703144 B1 2/2017

OTHER PUBLICATIONS

ComputerHope.com, "What is a Lookup Table?", Apr. 26, 2017, ComputerHope.com, (Year: 2017).*
(Continued)

*Primary Examiner* — Alan D Hutchinson
*Assistant Examiner* — Andy Schneider
(74) *Attorney, Agent, or Firm* — Sughrue Mion, PLLC

(57) ABSTRACT

A method of controlling a driving speed, which controls a working vehicle at a remote location to be driven on a route at an optical driving speed, is provided. The method includes: calculating terrain data based on a terrain scan image of the route acquired by a terrain scanner of the working vehicle; calculating the optimal driving speed according to the calculated terrain data; generating a driving control signal controlling the working vehicle to be driven on the route at the calculated optimal driving speed; calculating a vibration value of the working vehicle being driven on the route at the calculated optimal driving speed based on a sensing value acquired by a sensor of the working vehicle; adjusting the calculated optimal driving speed according to the calculated vibration value; and regenerating a driving control signal controlling the working vehicle to be driven on the route at the adjusted optimal driving speed.

16 Claims, 8 Drawing Sheets

(51) Int. Cl.
    *B60W 50/14*        (2020.01)
    *G06T 11/60*        (2006.01)
(52) U.S. Cl.
    CPC ..... *G05D 1/0246* (2013.01); *B60W 2050/146* (2013.01); *B60W 2420/42* (2013.01); *G05D 2201/0202* (2013.01); *G06T 11/60* (2013.01)
(58) Field of Classification Search
    CPC ............ B60W 40/06; B60W 2720/10; B60W 2552/35; B60W 50/14; B60W 2420/42; B60W 30/16; B60W 30/146; B60W 50/0097; B60K 2370/175; B60K 2310/22; G06T 11/206
    See application file for complete search history.

(56) References Cited

U.S. PATENT DOCUMENTS

| | | |
|---|---|---|
| 2008/0154629 A1 | 6/2008 | Breed et al. |
| 2015/0203116 A1* | 7/2015 | Fairgrieve ............... B60T 8/175 701/93 |
| 2019/0152478 A1* | 5/2019 | Kotteri .................. B60W 50/14 |
| 2020/0027288 A1* | 1/2020 | Ubelacker ............ G07C 5/0808 |

OTHER PUBLICATIONS

WhatIs.com, "Database Management System" Dec. 27, 2017, TechTarget.com (Year: 2017).*

* cited by examiner

DRIVING INFORMATION DISPLAY DEVICE, DRIVING INFORMATION DISPLAY METHOD, AND METHOD OF CONTROLLING DRIVING SPEED OF WORKING VEHICLE

CROSS REFERENCE TO THE RELATED APPLICATION

This application claims priority from Korean Patent Application No. 10-2018-0008536 filed on Jan. 24, 2018 in the Korean Intellectual Property Office, the disclosure of which is incorporated herein by reference in its entirety.

BACKGROUND

1. Field

Apparatuses and methods consistent with exemplary embodiments relate to controlling driving of a working vehicle that performs an operation at a remote location, and, more particularly, to calculating an optimal driving speed using terrain data and a vibration value and controlling a working vehicle to be driven at the calculated driving speed.

2. Description of the Related Art

Working vehicles such as an unmanned vehicle or a robot that perform works at remote locations may be driven in autonomous or remote driving modes.

In the case of autonomous driving, a working vehicle may acquire data on a driving route, calculate an optimal driving speed based on the acquired data, and be driven on the route at the optimal driving speed.

It may be required for a working vehicle to be driven stably without accident while it carries out a work at a remote location away from a user. Therefore, the working vehicle must calculate an optimal driving speed such that an error of an actual optimal driving speed is minimized with respect to the corresponding route.

In the case of remote driving, a remote control device may automatically control the driving of a working vehicle, or may manually control the driving of the working vehicle according to a user's input.

In the case where the remote control device automatically controls the driving of a working vehicle, similarly to the case of autonomous running, it is important to control the working vehicle to be driven at a speed similar to the actual optimal driving speed with respect to a corresponding route.

In the case where the remote control device manually controls the driving of a working vehicle, it may be required to provide driving information to a user such that the user can control the working vehicle to be driven at an optimal driving speed on a corresponding route.

Accordingly, the inventive concept intends to provide a method of calculating an optimal driving speed of a working vehicle on a route to be driven and a method of displaying driving information necessary for a user to control the working vehicle to be driven on a corresponding route at an optimal driving speed.

SUMMARY

Exemplary embodiments of the inventive concept provide an apparatus and method for displaying driving information necessary for a user to control a working vehicle to be driven on a route at an optimal driving speed.

The exemplary embodiments also provide a method of calculating an optimal driving speed of a working vehicle on a route to be driven by minimizing an error between the calculated optimal driving speed and an actual optimal driving speed.

According to an exemplary embodiment, there is provided a driving information display device, which displays an optimal driving speed for a route on which a working vehicle is to be driven. The driving information display device may include: a terrain data calculator which calculates terrain data based on a terrain scan image of the route acquired by a terrain scanner mounted on the working vehicle; an optimal driving speed calculator which calculates the optimal driving speed according to the calculated terrain data; an image generator which generates a composite image by combining the calculated optimal driving speed with an image of the route; and a display which displays the generated composite image.

According to another exemplary embodiment, there is provided a method of displaying driving information, by which an optimal driving speed for a route on which a working vehicle is to be driven is displayed. The method may include: calculating terrain data based on a terrain scan image of the route acquired by a terrain scanner mounted on the working vehicle; calculating the optimal driving speed according to the calculated terrain data; generating a composite image by combining the calculated optimal driving speed with an image of the route; and displaying the generated composite image.

According to still another exemplary embodiment, there is provided a method of controlling a driving speed, which controls a working vehicle at a remote location to be driven on a route at an optical driving speed. The method may include: calculating terrain data based on a terrain scan image of the route acquired by a terrain scanner mounted on the working vehicle; calculating the optimal driving speed according to the calculated terrain data; generating a driving control signal controlling the working vehicle to be driven on the route at the calculated optimal driving speed; calculating a vibration value of the working vehicle being driven on the route at the calculated optimal driving speed based on a sensing value acquired by a sensor mounted on the working vehicle; adjusting the calculated optimal driving speed according to the calculated vibration value; and regenerating a driving control signal controlling the working vehicle to be driven on the route at the adjusted optimal driving speed.

However, the inventive concept is not restricted to the one set forth herein. The above and other aspects of the inventive concept will become more apparent to one of ordinary skill in the art to which the inventive concept pertains by referencing the detailed description of the exemplary embodiments given below.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EXEMPLARY EMBODIMENTS

Figure 1:
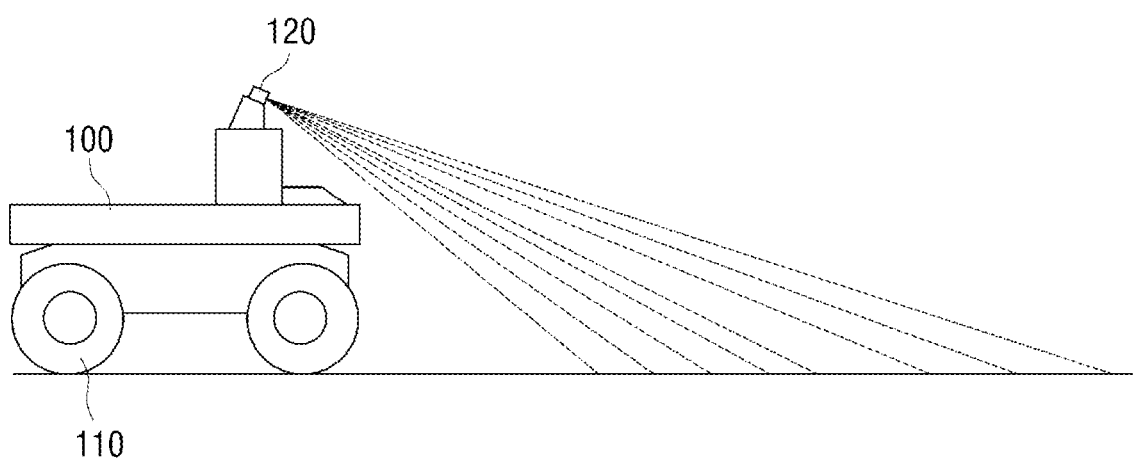
FIG. 1 shows a working vehicle according to an embodiment of the present invention.

Reference will now be made in detail to various exemplary embodiments of the inventive concept, which are illustrated in reference to the accompanying drawings and described below. The exemplary embodiments may be variously modified in many different forms. While the inventive concept will be described in conjunction with exemplary embodiments thereof, it is to be understood that the present description is not intended to limit the inventive concept to those exemplary embodiments. On the contrary, the inventive concept is intended to cover not only the exemplary embodiments, but also various alternatives, modifications, equivalents and other embodiments that may be included within the spirit and scope of the inventive concept as defined by the appended claims. Throughout the specification, the same reference numerals are used for the same or similar components.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and the inventive concept, and will not be interpreted in an idealized or overly formal sense unless expressly so defined herein.

The terms used herein are for the purpose of describing particular embodiments only and are not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, the exemplary embodiments will be described with reference to the attached drawings.

Figure 2:
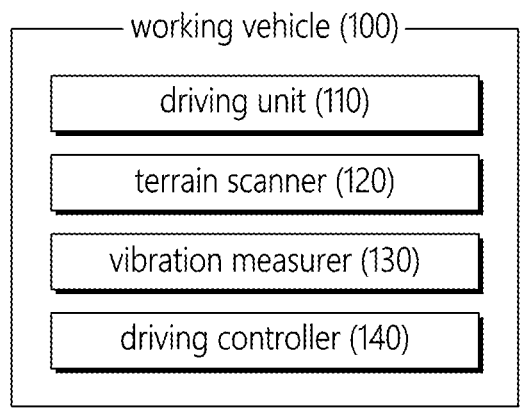
FIG. 2 is a block diagram showing components of the working vehicle according to an embodiment of the present invention.
Figure 3:
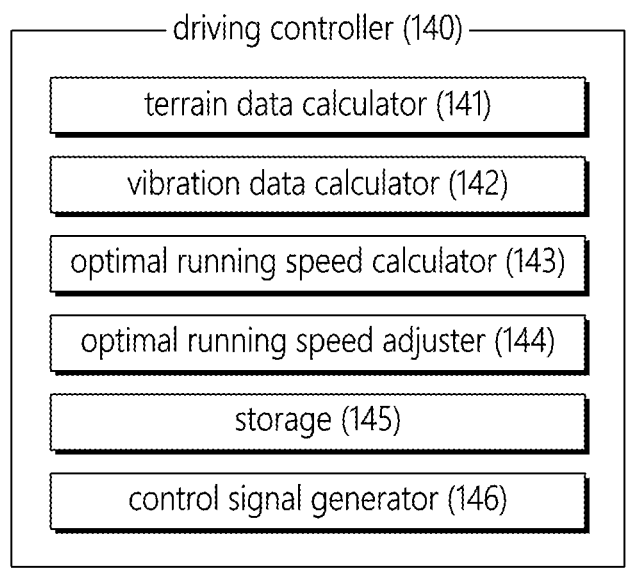
FIG. 3 is a block diagram showing components of a driving controller in the working vehicle according to an embodiment of the present invention.

FIG. 1 shows a working vehicle according to an exemplary embodiment. FIG. 2 is a block diagram showing components of the working vehicle according to an exemplary embodiment. FIG. 3 is a block diagram showing components of a driving controller included in the working vehicle according to an exemplary embodiment.

Referring to FIGS. 1 to 3, a working vehicle 100 according to an exemplary embodiment may include a driving unit 110, a terrain scanner 120, a vibration measurer 130, and a driving controller 140.

The working vehicle 100 is a vehicle that performs a work at a remote location, and may represent an unmanned vehicle or a mobile robot. The working vehicle 100 may be provided with the driving unit 110 so as to perform a work at a remote location while moving.

The work vehicle 100 may acquire information about a route to be driven. For this purpose, the working vehicle 100 according to an exemplary embodiment may be provided with the terrain scanner 120 and the vibration measurer 130.

The terrain scanner 120 may perform a function of predicting information about the route before the work vehicle 100 is driven on the route. The terrain scanner 120 may be configured as a terrain scanning device, and may scan a route on which the work vehicle 100 is to be driven to acquire a terrain scan image. In an exemplary embodiment, it is assumed that a laser radar (radio detection and ranging) is used as a terrain scanning device. Since the laser radar uses a laser beam as an electromagnetic wave, the route may be scanned with better azimuth resolution and distance resolution.

The laser radar may be mounted on an upper side of the working vehicle 100 to scan a wider area. Further, the laser radar may be mounted rotatably with respect to the working vehicle 100 to scan an environment in all directions.

The vibration measurer 130 may perform a function of acquiring information about the route scanned by the terrain scanner 120 when the working vehicle 100 is driven on this route. The vibration measurer 130 may be configured as a vibration measuring sensor capable of measuring vibrations. Specifically, the vibration measurer 130 may be configured as a sensor such as an inertial sensor to measure vibrations generated from the working vehicle 100 being driven on the route. The inertial sensor may be a gyro sensor, for example. More specifically, the vibration measurer 130 may acquire sensing values of a vibration frequency, a vibration acceleration, a vibration velocity, and a vibration displacement.

The driving controller 140 is a component that generates a driving control signal to control the working vehicle 100 to be driven on the route at an optimal driving speed, and may include a terrain data calculator 141, a vibration value calculator 142, an optimal driving speed calculator 143, an optimal driving speed adjuster 144, a storage 145, and a control signal generator 146.

The terrain data calculator 141 may calculate the terrain data of the route on which the work vehicle 100 is to be driven, based on the terrain scan image acquired by the terrain scanner 120. In this case, the terrain data may be data obtained by quantifying characteristics of the route to be driven on. For example, the characteristics may include a level of unevenness or ruggedness of a ground of the route.

For example, the level of unevenness of the ground can be numerically expressed in a range of 0 to 100. When the route of the working vehicle 100 to be driven is a pavement road, where the level of unevenness of the ground is low, terrain data close to 0 may be calculated. When the route of the working vehicle 100 to be driven is a non-pavement road, terrain data of a higher value than the pavement road may be calculated.

The terrain data may be of a type of terrain recognized based on a digitized terrain database stored in the storage 145. The terrain database may include information about typical terrains, such as sandy field and gravelly field, and sample terrain scan images thereof. When a sample terrain scan image similar to a terrain scan image acquired by the terrain scanner 120 at a predetermined ratio or more are retrieved, the terrain data calculator 141 may calculate a type of terrain corresponding to the retrieved terrain scan image as terrain data. The terrain data calculator 141 may search for a sample terrain scan image similar to a terrain scan image from the terrain database through a general image processing algorithm and a learning algorithm.

For example, when a terrain scan image acquired by the terrain scanner 120 is similar to a sample terrain scan image for a gravelly field at a predetermined ratio or more, the terrain data calculator 141 may calculate the terrain data as a gravelly field.

The storage 145 may store a driving database including terrain data and a temporary driving speed matching the terrain data. The temporary driving speed may be a randomly set value or a value set to a driving speed suitable for driving a terrain corresponding to the terrain data by reflecting empirical values.

For example, in the driving database, the temporary driving speed may set to 30 km/h for terrain data in which the level of unevenness of a ground is quantified as 40, 25 km/h for terrain data in which the level of unevenness of a ground is quantified as 50, 25 km/h for terrain data recognized as a sandy field, and 20 km/h for terrain data recognized as a gravelly field.

Since the storage 145 must be able to store data, a storage medium should be used. Examples of the storage medium that can be used as the storage 145 may include, but are not limited to, a hard disk drive (HDD), a solid state drive (SSD), a compact flash (CF), and a secure digital (SD) card.

The optimal driving speed calculator 143 may calculate an optimal driving speed for a route on which the working vehicle 100 is to be driven on the basis of terrain data calculated by the terrain data calculator 141. More specifically, the optimal driving speed calculator 143 may search for a temporary driving speed corresponding to terrain data calculated from the driving database stored in the storage 145, and select the searched temporary driving speed as an optimal driving speed. When the temporary driving speed cannot be searched for from the driving database, the optimal driving speed calculator 143 may select an arbitrary speed as the optimal driving speed. The optimal driving speed calculated by the optimal driving speed calculator 143 may have a speed value or may be in a speed range.

The control signal generator 146 may generate a driving control signal controlling the working vehicle 100 to be driven on a driving route at a calculated optimal driving speed. When an optimal driving speed calculated by the optimal driving speed calculator 143 has a speed value, the optimal driving speed calculator 143 may generate a driving control signal controlling the working vehicle 100 to be driven at this speed value. Further, when a calculated optimal driving speed is a speed range, the optimal driving speed calculator 143 may generate a driving control signal controlling the working vehicle 100 to be driven in this speed range.

When there is a difference between a current driving speed and a calculated optimal driving speed, the control signal generator 146 may generate a driving control signal which controls a speed change to gradually occur from the current driving speed to the optimal driving speed.

More specifically, when the optimal driving speed is higher than the current driving speed, the control signal generator 146 may control the working vehicle 100 to increase the driving speed after the working vehicle 100 enters a route or an area of corresponding terrain data to be driven. Further, when the optimal driving speed is lower than the current driving speed, the control signal generator 146 may control the working vehicle 100 to decrease the driving speed before the working vehicle 100 enters a route or an area of corresponding terrain data to be driven.

Figure 4:
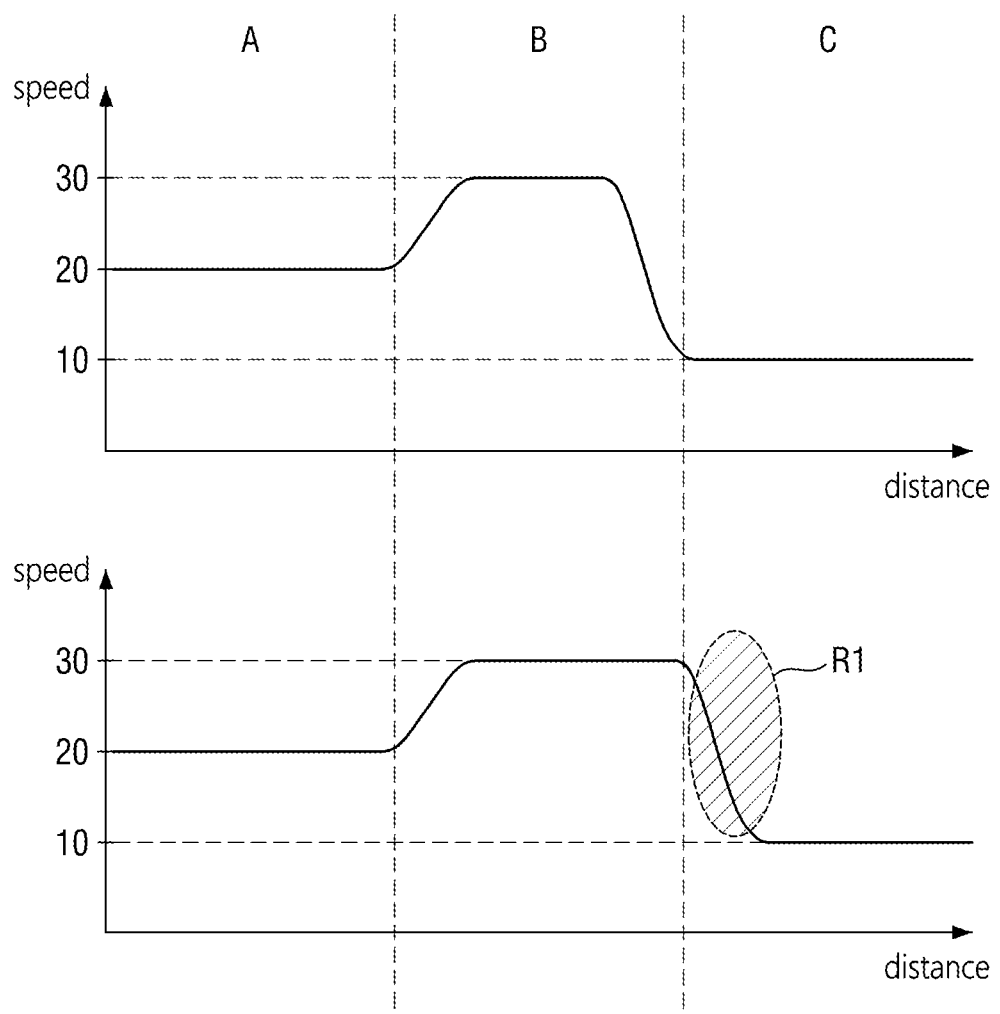
FIG. 4 shows graphs showing comparisons of the driving speed of the working vehicle according to an embodiment of the present invention with the driving speed of a general working vehicle.

For example, referring to the upper graph of FIG. 4, with respect to the working vehicle 100 driving at a speed of 20 km/h in the section A, when the optimal driving speed in the section B is calculated as 30 km/h, the control signal generator 146 may control the working vehicle 100 to increase the driving speed after the working vehicle 100 enters the section B. Further, when the working vehicle 100 runs the section B at a speed of 30 km/h and the optimal driving speed in the section C is calculated as 10 km/h, the control signal generator 146 may control the working vehicle 100 to decrease the driving speed before the working vehicle 100 enters the section C.

Since the control signal generator 146 generates a driving control signal based on an optimum driving speed calculated in advance for the route to be driven in the feed forward manner, the control signal generator 146 may control the working vehicle 100 to decrease the driving speed before the working vehicle 100 enters the route to be driven. Therefore, the driving stability of the working vehicle 100 can be increased.

Unlike this, when a driving control signal is generated only in a feedback manner, as shown in the lower graph of FIG. 4, the working vehicle 100 has to decrease the driving speed after entering the section C. That is, the working vehicle 100 runs at a speed higher than the optimal driving speed for a certain period, which may cause an accident to the working vehicle 100.

The vibration value calculator 142 may calculate a vibration value of vibration occurring when the work vehicle 100 runs along a corresponding route, according to a driving control signal generated by the control signal generator 146. For this purpose, the vibration value calculator 142 may calculate a vibration value obtained by quantifying a level of vibration according to a sensing value measured by the vibration measurer 130.

For example, when the vibration value calculator 142 receives sensing values for vibration frequency, vibration acceleration, vibration velocity, and vibration displacement from the vibration measurer 130, the vibration value calculator 142 may quantify a level of vibration according to a sum of values obtained by adding weights to a sensing value of vibration frequency, a sensing value of vibration acceleration, a sensing value of vibration velocity, and a sensing value of vibration displacement, respectively. The level of vibration may be quantified in any range, for example, in the range of 0 to 100. The level of vibration may be quantified to be close to 100 as it increases.

The optimal driving speed adjuster 144 may adjust an optimal driving speed calculated by the optimal driving speed calculator 143 according to a vibration value calculated by the vibration value calculator 142. For this purpose, the optimal driving speed adjuster 144 may adjust a calculated optimal driving speed by comparing a vibration value with a reference value. Further, the optimal driving speed adjuster 144 may update the driving database by changing the temporary driving speed value of the driving database used in calculating an optimal driving speed to an adjusted optimal driving speed.

More specifically, the optimal driving speed adjuster 144 may decrease a calculated optimal driving speed when an obtained vibration value is greater than or equal to a first reference value, may not change the calculated optimal driving speed when the obtained vibration value is less than or equal to the first reference value and greater than or equal to a second reference value, and may increase the calculated optimal driving speed when the obtained vibration value is less than or equal to the second reference value. In this case, the first reference value may be higher than the second reference value, and may be an upper limit of a vibration value acceptable to the working vehicle 100. The second reference value may be a reference value by which the working vehicle 100 can be accelerated.

For example, in the case where a vibration value is quantified in the range of 0 to 100, the first reference value is 70, and the second reference value is 30, when the vibration value is 80, this value is greater than or equal to the first reference value, so that the calculated optimal driving speed may be decreased, when the vibration value is 20, this value is less than or equal to the second reference value, so that the calculated optimal driving speed may be increased, and when the vibration value is 40, this value is between the first reference value and the second reference value, so that the calculated optimal driving speed may not be changed.

When the optimal driving speed is adjusted, the control signal generator 146 may generate a driving control signal controlling the working vehicle 100 to be driven on a corresponding route at the adjusted optimal driving speed. The control signal generator 146 may generate a driving control signal controlling the driving speed of the working vehicle 100 to gradually change from the optimal driving speed to the adjusted optimal driving speed.

Since the control signal generator 146 generates a driving control signal in a feedback manner using the optimal driving speed adjusted by the vibration value, it is possible to control the working vehicle 100 to be driven on the corresponding route at a speed similar to the actual optimal driving speed.

Figure 5:
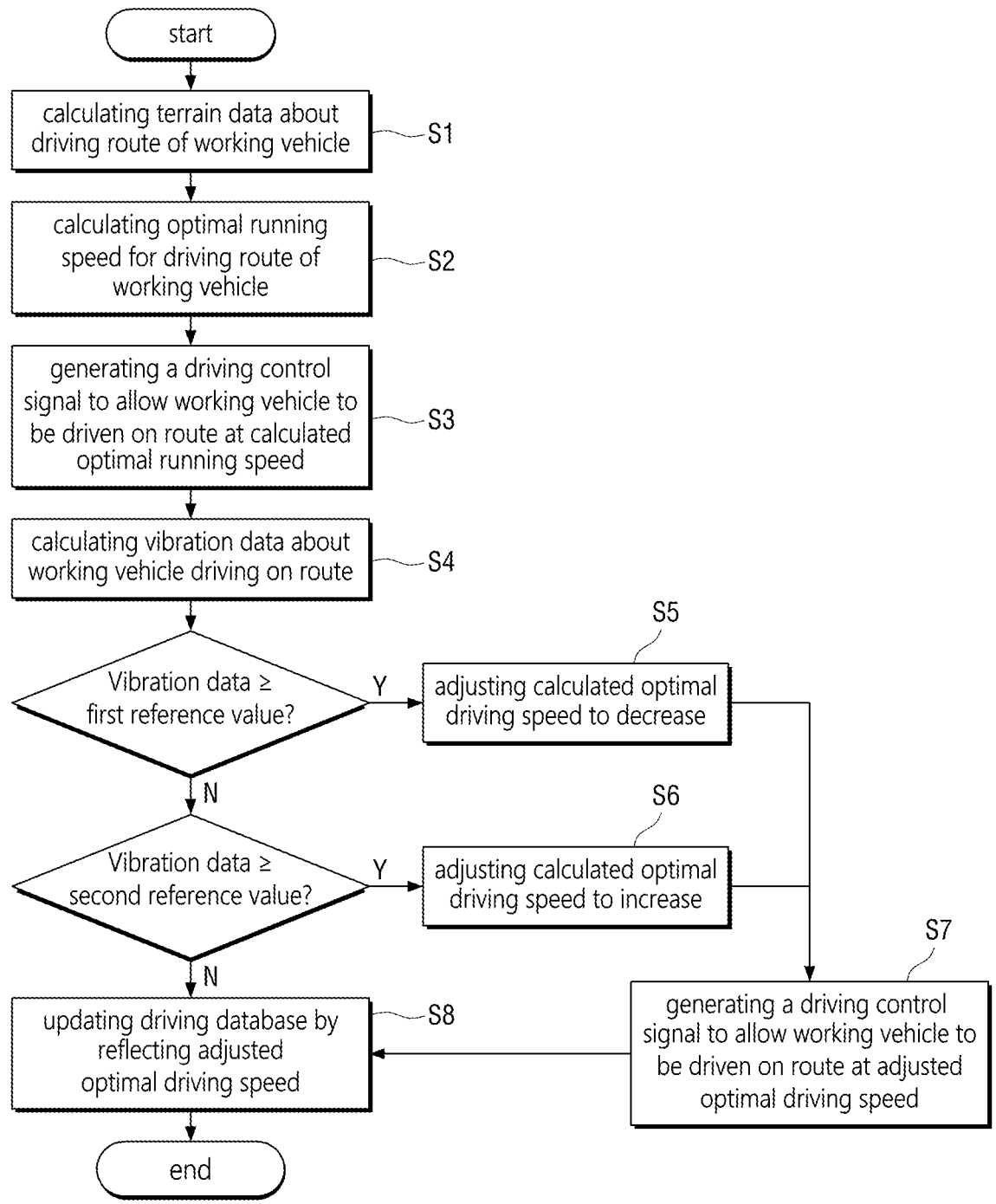
FIG. 5 is a flowchart showing a method of generating a driving control signal of the working vehicle according to an embodiment of the present invention.

Based on the above configuration, a method of generating a driving control signal in a working vehicle according to an exemplary embodiment will be described with reference to FIG. 5.

First, the terrain scanner 120 acquires a terrain scan image for a route on which the working vehicle 100 is to be driven, and the terrain data calculator 141 calculates terrain data based on the terrain scan image (S1). For example, the terrain data calculator 141 may calculate a value (for example 40) obtained by quantifying a level of unevenness of a ground from the terrain scan image as terrain data, or may calculate the kind of the terrain (for example, sandy field) corresponding to a sample terrain scan image similar to the terrain scan image as terrain data.

The optimal driving speed calculator 143 generates an optimal driving speed for the route on which the work vehicle 100 is to be driven, based on the calculated terrain data calculated from a driving database (S2). The optimal driving speed calculator 143 may search for a temporary driving speed corresponding to the terrain data, and may select the searched temporary driving speed as an optimal driving speed. Further, the optimal driving speed calculator 143 may select an arbitrary driving speed as the optical driving speed when the terrain data is not searched.

The control signal generator 146 generates a driving control signal controlling the working vehicle 100 to be driven on the route at the calculated optimal driving speed (S3). The control signal generator 146 generates a driving control signal controlling the speed of the working vehicle 100 to gradually change from a current driving speed to the calculated driving speed.

The vibration scanner 120 senses vibration of the work vehicle 100 being driven on the route according to the driving control signal, and the vibration value calculator 142 calculates a vibration value in which a level of vibration is quantified based on a measured sensing value (S4). For example, when the vibration scanner 120 senses a vibration frequency, a vibration acceleration, a vibration velocity, and a vibration displacement, the vibration value calculator 142 may quantify the level of vibration according to a sum of values obtained by adding weighs to the sensing value of the vibration frequency, the sensing value of the vibration acceleration, the sensing value of the vibration velocity, and the sensing value of the vibration displacement, respectively.

The optimal driving speed adjuster 144 adjusts the calculated driving speed according to the calculated vibration value. When the calculated vibration value is greater than or equal to a first reference value, the optimal driving speed adjuster 144 decrease the calculated optimal driving speed (S5), when the calculated vibration value is less than or equal to a second reference value, the optimal driving speed adjuster 144 increases the calculated optimal driving speed (S6), and, in other cases, the optimal driving speed adjuster 144 does not change the calculated optimal driving speed (S7). Finally, the driving database is updated by reflecting the optimal driving speed adjusted by the optimal driving speed adjuster 144 (S8).

Heretofore, the method of calculating an optimal driving speed and driving a working vehicle at the calculated optimal driving speed according to an exemplary embodiment has been described with reference to FIGS. 1 to 5. Hereinafter, a method of controlling a working vehicle to be driven at an optimal driving speed in a driving information display device that remotely controls the working vehicle will be described.

Figure 6:
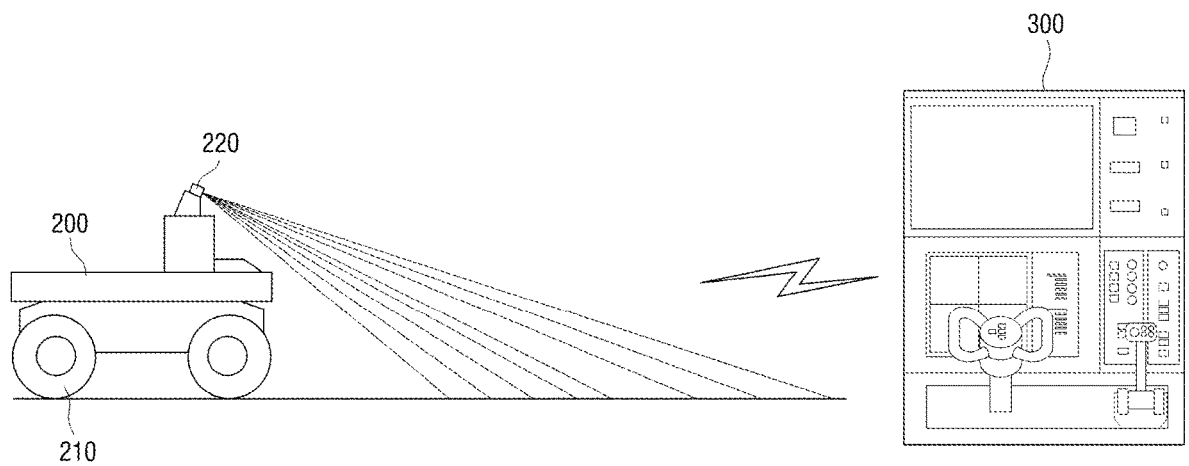
FIG. 6 shows a working vehicle and a driving information display device according to another embodiment.
Figure 7:
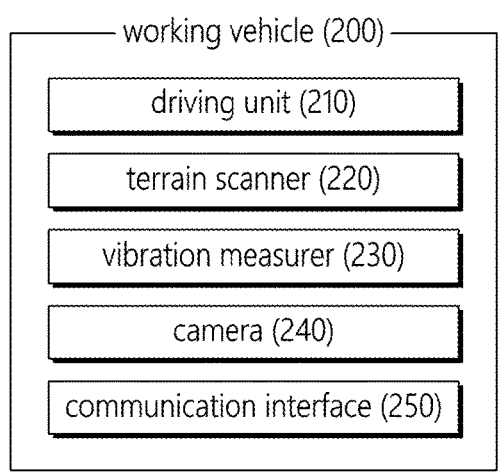
FIG. 7 is a block diagram showing components of the working vehicle according to another embodiment of the present invention.
Figure 8:
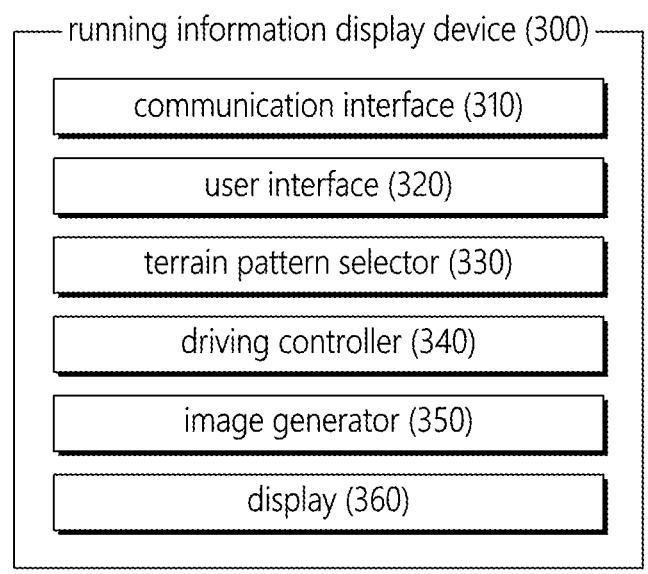
FIG. 8 is a block diagram showing components of the driving information display device according to another embodiment of the present invention.
Figure 9:
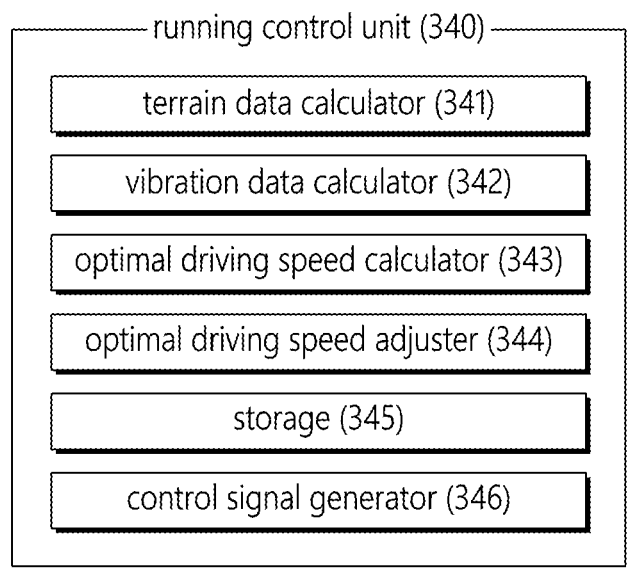
FIG. 9 is a block diagram showing components of a driving controller in the driving information display device according to another embodiment of the present invention.

FIG. 6 shows a working vehicle and a driving information display device according to an exemplary embodiment. FIG. 7 is a block diagram showing components of the working vehicle according to an exemplary embodiment. FIG. 8 is a block diagram showing the components of the driving information display device according to an exemplary embodiment. FIG. 9 is a block diagram showing components of a driving controller in the driving information display device according to an exemplary embodiment.

Referring to FIGS. 6 to 9, a working vehicle 200 according to an exemplary embodiment may include a driving unit 210, a terrain scanner 220, a vibration measurer 230, a camera 240, and a communication interface 250. A driving information display device 300 according to an exemplary embodiment includes a communication interface 310, a user interface 320, a terrain pattern selector 330, a driving controller 340, an image generator 350, and a display 360. The driving unit 210, the terrain scanner 220, the vibration measurer 230, and the driving controller 340 are components having been described in the embodiment with reference to FIGS. 1 to 5, other exemplary embodiments will be described except for the redundant description.

The camera 240 may capture an image of a route on which the work vehicle 200 is to be driven. Various camera modules may be included in the camera 240. The camera modules may include, but are not limited to, zoom type camera modules, dome type camera modules, pan/tilt/zoom (PTZ) camera modules, infrared (IR) camera modules, and fisheye type camera modules.

The camera 240 includes a lens system for receiving and condensing light and an image sensor for obtaining a valid signal from the light condensed by the lens system. The image pickup unit 240 may further include an optical filter such as a day/night (D/N) filter. The image sensor may be a charge-coupled device (CCD) or a complementary metal-oxide-semiconductor (CMOS), but is not limited thereto.

The communication interface 250 of the working vehicle 200 and the communication interface 310 of the driving information display device 300 may establish communication connection and exchange data wirelessly or by wire. Here, at least one of the communication interface 250 and the communication interface 310 may include any one or any combination of a digital modem, a radio frequency (RF) modem, a WiFi chip, and related software and/or firmware. The work vehicle 200 may transmit an image captured by the camera 240, a terrain scan image acquired by the terrain scanner 220, and a vibration sensing value measured by the vibration measurer 230 to the driving information display device 300. The driving information display device 300 may generate a driving control signal for controlling the driving of the working vehicle 200 and transmit the driving control signal to the working vehicle 200.

The driving information display device 300 is a device for displaying driving information necessary for controlling the driving of the working vehicle 200. In this case, as the driving information, a driving speed of the working vehicle being driven on a current route, an adjusted optimal driving speed, a vibration value, an optimal driving speed calculated for a next route, and a terrain pattern may be displayed.

When the display 360 of the driving information display device 300 displays driving information, the user may input a user command to the user interface 320 to control the driving of the work vehicle 200 based on the displayed driving information. The control signal generator 346 may generate a driving control signal according to the input user command.

The terrain pattern selector 330 may select a terrain pattern for terrain data calculated by the terrain data calculator 141. The terrain pattern may include various display marks such as pattern, color, and symbol.

When the terrain data is calculated as a value obtained by quantifying a level of unevenness of a ground, the terrain pattern may be selected as a color having brightness proportional to the quantified value. Further, when the terrain data is calculated as a type of terrain, the terrain pattern may be selected as a pattern classified for each type of terrain.

Figure 10:
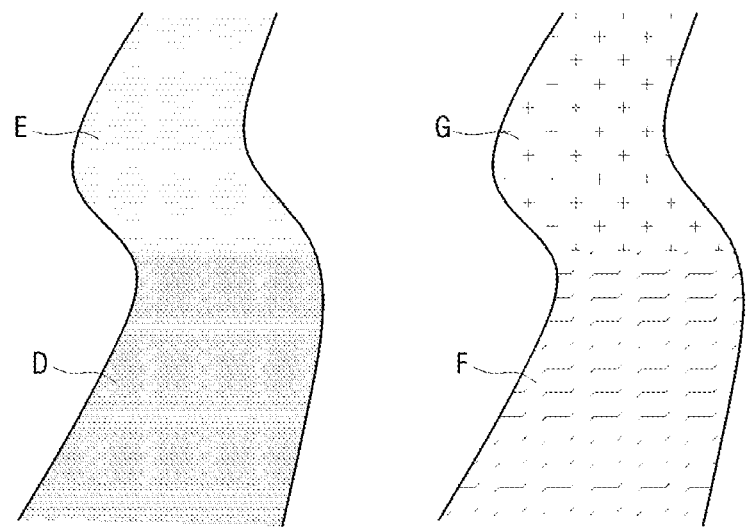
FIG. 10 shows a terrain pattern selected by the driving information display device according to another embodiment of the present invention.

For example, referring to FIG. 10, when section D is a section where a level of unevenness is high and terrain data is calculated as 50, and when section E is a section where a level of unevenness is low and terrain data is calculated as 20, a terrain pattern in section D may be selected to have lower brightness. Further, when a terrain pattern in section F is calculated as a gravelly field, and when a terrain pattern in the section G is calculated as a sandy field, the terrain pattern may be selected as different patterns for each section.

The image generator 350 may generate a composite image obtained by combining an image of a route captured by the camera 240 with driving information. In order to generate the composite image, the image generator 350 may receive a terrain pattern selected from the terrain pattern selector 330, a vibration value calculated from the vibration value calculator 342, an optimal driving speed calculated from the optimal driving speed calculator 343, and the optimal driving speed adjusted from the optimal driving speed adjuster 344.

Figure 11:
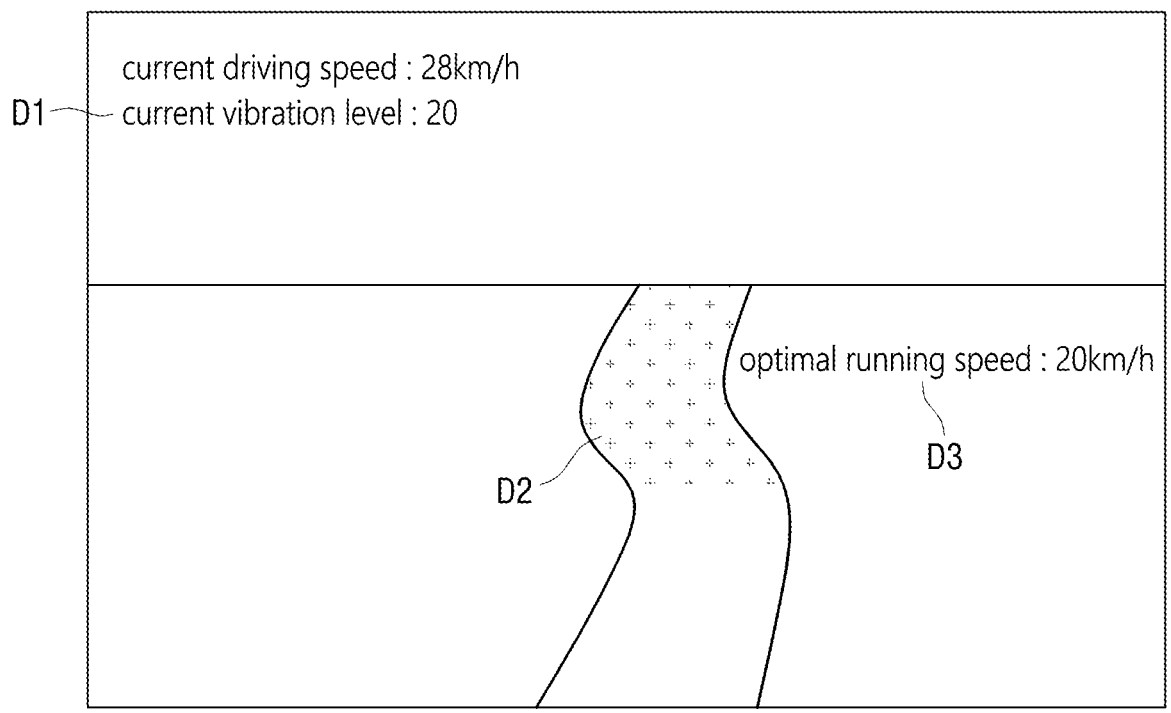
FIGS. 11 and 12 show images displayed on the driving information display device according to another embodiment of the present invention.

FIG. 11 shows an exemplary embodiment of a composite image generated by the image generator 350, which is displayed on the display 360. In the exemplary embodiment referring to FIG. 11, it is assumed that the terrain data calculator 141 calculates terrain data of a next driving section of a route on which the work vehicle 200 is to be driven, as a sandy field.

Referring to FIG. 11, a current vibration level D1 may be displayed based on a vibration value calculated by the vibration value calculator 342. A terrain pattern D2 selected by the terrain pattern selector 330 may be displayed on the route, and an optimal driving speed D3 for the route calculated by the optimal driving speed calculator 343 may be displayed.

The user may input a user command to safely drive the work vehicle 200 by referring to the displayed driving information. The user may receive a feedback from the current vibration level D1 and input a user command. Further, the user may receive an optimal driving speed for the next driving section and a feed forward from the terrain pattern D2 and input a user command.

For example, when the vibration value is quantified in the range of 0 to 100 and the current vibration level is 20, which means a low vibration level, the user may input a user command controlling the work vehicle 200 to maintain a current driving speed or be driving at a higher speed, in consideration of the current vibration level D1. Further, the user may input a user command controlling the working vehicle 200 to be driven at an optimal driving speed of 20 km/h, in consideration of the optimal driving speed D3 of the next driving section and the terrain pattern D2 for the sandy field.

Figure 12:
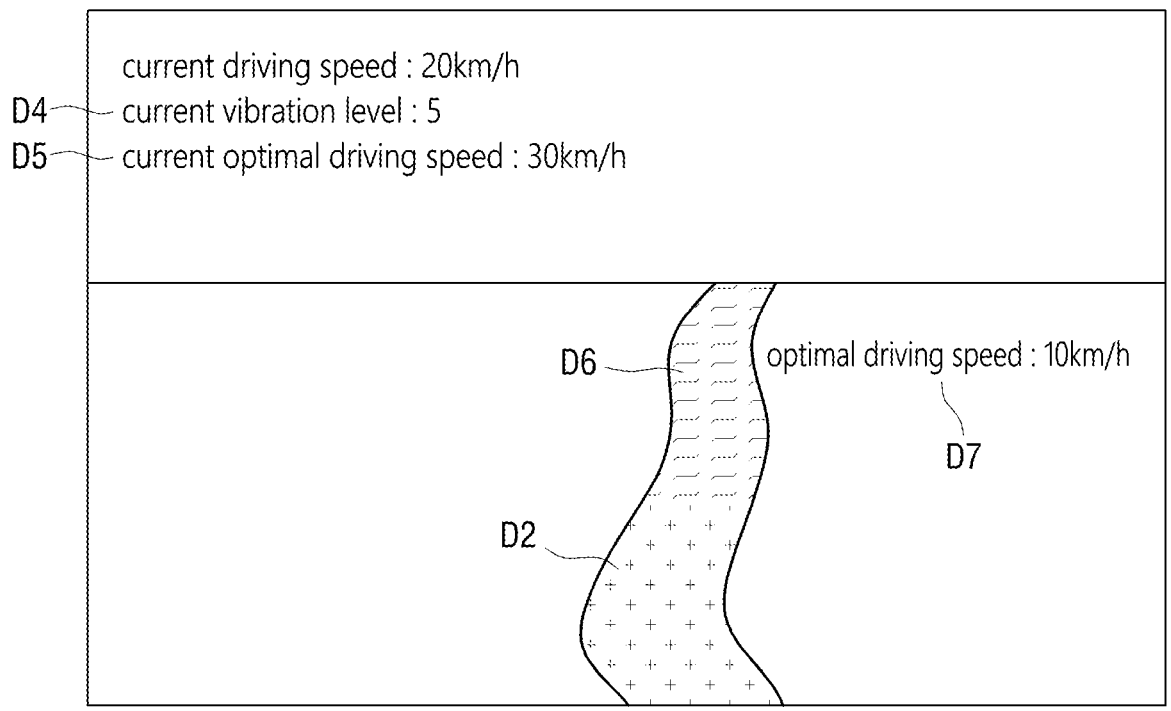

FIG. 12 shows another exemplary embodiment of the composite image generated by the image generating unit 350 with respect to the working vehicle 200 driving continuously along the route shown in FIG. 11. In this embodiment referring to FIG. 12, it is assumed that the terrain data calculator 141 calculates a sandy filed as the terrain data of the current driving section of the route on which the working vehicle 200 is driven and calculates a gravelly field as terrain data of a next driving section.

The terrain pattern D2 for the current driving section and a terrain pattern D6 for the next driving section, which were calculated by the terrain pattern selector 330, may be displayed. Further, a vibration level D4 for the current driving section may be displayed based on a vibration value calculated by the vibration value calculator 342. Further, an optimal driving speed D5 for the current driving section, adjusted by the optimal driving speed adjuster 344 may be displayed. Further, an optimal driving speed D7 for the next driving route, calculated by the optimal driving speed calculator 343, may be displayed.

The user may input a user command to safely drive the work vehicle 200 by referring to the displayed driving information. The user may receive a feedback from the current vibration level and the current optimal driving speed and input a user command. Further, the user may receive an optimal driving speed for the next driving section and a feed forward from the terrain pattern and input a user command.

For example, when the vibration value is quantified in the range of 0 to 100 and the current vibration level is 5, which means a low vibration level, the user may input a user command controlling the work vehicle 200 to maintain a current driving speed or be driven at a higher speed, in consideration of the current vibration level D4. Further, the user may input a user command controlling the working vehicle 200 to be driven at a current optimal driving speed of 30 km/h, in consideration of the current optimal driving speed D5. Further, the user may input a user command controlling the working vehicle 200 to be driven in advance from the current driving section at a speed of 10 km/h, in consideration of the optimal driving speed D7 of the next driving section and the terrain pattern D6 for the gravelly field.

When the user command is input, the control signal generator 346 may generate a driving control signal controlling the working vehicle 200 to be driven according to the user command. When the user command is not input, the control signal generator 346 may generate a driving control signal controlling the working vehicle 200 to be driven at an optimal driving speed calculated by the optimal driving speed calculator 343 and an optimal driving speed adjusted by the optimal driving speed adjuster 344. That is, the driving information display device 300 may control the working vehicle 200 to be driven in a manual driving manner by the user command or may control the working vehicle 200 to be driven in an automatic driving manner by the control signal generator 346.

As described above, according to the exemplary embodiments, there are at least the following effects.

According to the inventive concept, an optimal driving speed of a working vehicle is calculated through terrain data on a route of a working vehicle to be driven (feed forward manner), and the calculated optimal driving speed is adjusted through a vibration value measured during the driving of the working vehicle on a corresponding route (feedback manner), so that it is possible to minimize an error between an actual optimal driving speed and the calculated optimal driving speed with respect to the route of the working vehicle to be driven.

Further, according to the inventive concept, since the terrain data, the vibration value, and the optimal driving speed are displayed to a user as driving information, the user can control the working vehicle to be driven at an optimal driving speed at a remote location with reference to the displayed driving information.

The effects of the inventive concept are not limited by the foregoing, and other various effects are anticipated herein.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units (collectively "components" in this paragraph) represented by a block in the drawings, e.g., FIGS. 2-3 and 7-9, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Although the exemplary embodiments of the inventive concept have been disclosed for illustrative purposes, those skilled in the art will appreciate that various modifications, additions and substitutions are possible, without departing from the scope and spirit of the inventive concept as disclosed in the accompanying claims.

What is claimed is:

1. A driving information display device, which displays an optimal driving speed for a route on which a working vehicle is to be driven, the device comprising:
   a terrain data calculator which calculates terrain data based on a terrain scan image of the route acquired by a terrain scanner mounted on the working vehicle;
   an optimal driving speed calculator which calculates the optimal driving speed according to the calculated terrain data;
   a vibration value calculator which calculates a vibration value of the working vehicle being driven on the route at the calculated optimal driving speed based on a sensing value acquired by a vibration measuring sensor mounted on the working vehicle wherein the optimal driving speed is adjusted based on a comparison between the calculated vibration value and a reference vibration value;
   an image generator which generates a composite image which includes the calculated optimal driving speed, the calculated vibration value, and an image of the route; and
   a display which displays the generated composite image, wherein the calculated vibration value included in the composite image comprises a number representing an amount of vibration detected by the vibration measuring sensor, and wherein the calculated vibration value is determined by adding weights to at least two of a sensing value of vibration frequency, a sensing value of vibration acceleration, a sensing value of vibration velocity, and a sensing value of vibration displacement.

2. The driving information display device of claim 1, further comprising a terrain pattern selector which selects a terrain pattern corresponding to the calculated terrain data, wherein the image generator generates the composite image by additionally combining the selected terrain pattern.

3. The driving information display device of claim 2, wherein the image generator generates the composite image by overlaying the selected terrain pattern on the route in the image of the route.

4. The driving information display device of claim 2, wherein the terrain pattern comprises at least one of a pattern, a color, and a symbol.

5. The driving information display device of claim 1, wherein the terrain data comprises a value obtained by quantifying characteristics of the route on which the working vehicle is to be driven, or a type of a terrain recognized based on the terrain scan image.

6. The driving information display device of claim 5, wherein the characteristics of the route comprises a level of unevenness of the route.

7. A method of displaying driving information, by which an optimal driving speed for a route on which a working vehicle is to be driven is displayed, the method comprising:
calculating terrain data based on a terrain scan image of the route acquired by a terrain scanner mounted on the working vehicle;
calculating the optimal driving speed according to the calculated terrain data;
calculating a vibration value of the working vehicle being driven on the route at the calculated optimal driving speed base on a sensing value acquired by a vibration measuring sensor mounted on the working vehicle, wherein the optimal driving speed is adjusted based on a comparison between the calculated vibration value and a reference vibration value;
generating a composite image including the calculated optimal driving speed, the calculated vibration value, and an image of the route; and
displaying the generated composite image,
wherein the calculated vibration value included in the composite image comprises a number representing an amount of vibration detected by the vibration measuring sensor, and
wherein the calculated vibration value is determined by adding weights to at least two of a sensing value of vibration frequency, a sensing value of vibration acceleration, a sensing value of vibration velocity, and a sensing value of vibration displacement.

8. The method of claim 7, further comprising selecting a terrain pattern corresponding to the calculated terrain data, wherein, in the composite image, the selected terrain pattern is indicated.

9. A method of controlling a driving speed, which controls a working vehicle at a remote location to be driven on a route at an optimal driving speed, the method comprising:
acquiring, by a terrain scanner mounted on the working vehicle, a terrain scan image of the route;
calculating terrain data based on the terrain scan image;
calculating the optimal driving speed according to the calculated terrain data;
generating a driving control signal controlling the working vehicle to be driven on the route at the calculated optimal driving speed;
acquiring a sensing value by a sensor mounted on the working vehicle;
calculating a vibration value of the working vehicle being driven on the route at the calculated optimal driving speed based on the sensing value;
adjusting the calculated optimal driving speed based on a comparison between the calculated vibration value and a reference vibration value; and
regenerating a driving control signal controlling the working vehicle to be driven on the route at the adjusted optimal driving speed,
capturing an image of the route on which the working vehicle is to be driven using the terrain scanner;
generating a composite image including the calculated optimal driving speed and the adjusted optimal driving speed, the calculated vibration value, and the captured image, and
displaying the composite image,
wherein the calculated vibration value included in the composite image comprises a number representing an amount of vibration detected by the sensor, and
wherein the calculated vibration value is determined by adding weights to at least two of a sensing value of vibration frequency, a sensing value of vibration acceleration, a sensing value of vibration velocity, and a sensing value of vibration displacement.

10. The method of claim 9, wherein the calculating the optimal driving speed comprises:
searching for a temporary driving speed corresponding the calculated terrain data from a driving database; and
setting the searched temporary driving speed to the optimal driving speed.

11. The method of claim 10, further comprising updating the driving database by changing the temporary driving speed searched from the driving database to the adjusted optimal driving speed.

12. The method of claim 9, wherein the reference vibration value comprises a first reference vibration value and a second reference vibration value, and
wherein the adjusting the calculated optimal driving speed comprises:
decreasing the calculated optimal driving speed in response to determining that the vibration value is greater than or equal to the first reference vibration value;
increasing the calculated optimal driving speed in response to determining that the vibration value is less than or equal to the second reference vibration value; and
maintaining the calculated optimal driving speed in response to determining that the vibration value is less than the first reference vibration value and is greater than the second reference vibration value.

13. The method of claim 9, wherein the generating the driving control signal comprises:
acquiring a current driving speed of the working vehicle; and
generating the driving control signal controlling a driving speed of the working vehicle to gradually decrease from the current driving speed to the optimal driving speed before the working vehicle enters the route, in response to determining that the calculated optimal driving speed is lower than the current driving speed.

14. The method of claim 9, wherein the generating the driving control signal comprises:
- acquiring a current driving speed of the working vehicle; and
- generating the driving control signal controlling a driving speed of the working vehicle to gradually decrease from the current driving speed to the optimal driving speed after the working vehicle enters the route, in response to determining that the calculated optimal driving speed is lower than the current driving speed.

15. The method of claim 9, further comprising selecting a terrain pattern for the calculated terrain data,
- wherein, in the composite image, the selected terrain pattern is indicated.

16. The method of claim 15, wherein, in the composite image, the selected terrain pattern is overlaid on the route in the image of the route.

\* \* \* \* \*